United States Patent [19]

Catallo

[11] Patent Number: 5,653,555

[45] Date of Patent: Aug. 5, 1997

[54] MULTIPLE RESIN SYSTEM FOR REHABILITATING PIPE

[75] Inventor: Giulio Catallo, Houston, Tex.

[73] Assignee: Inliner, U.S.A., Houston, Tex.

[21] Appl. No.: 445,365

[22] Filed: May 19, 1995

[51] Int. Cl.$^6$ .............................. F16L 1/00; F16L 55/16
[52] U.S. Cl. .................... 405/154; 156/287; 156/294; 264/516; 405/146
[58] Field of Search .................... 405/154, 150.1, 405/146; 156/294, 287; 264/516, 573, 36

[56] References Cited

U.S. PATENT DOCUMENTS

| | | |
|---|---|---|
| 130,303 | 8/1872 | Libby . |
| 143,661 | 10/1873 | Blake . |
| 154,725 | 9/1874 | Street . |
| 268,903 | 12/1882 | Johnson . |
| 470,669 | 3/1892 | Fitzpatrick . |
| 602,301 | 4/1898 | Bramlette . |
| 614,749 | 11/1898 | Pallas . |
| 680,974 | 8/1901 | Healey . |
| 738,289 | 9/1903 | Buckley . |

(List continued on next page.)

FOREIGN PATENT DOCUMENTS

| | | |
|---|---|---|
| 662560 | 10/1965 | Belgium . |
| 987576 | 4/1976 | Canada . |
| 1 134 290 | 10/1982 | Canada . |
| 1 195 128 | 10/1985 | Canada . |
| 1 217 416 | 2/1987 | Canada . |
| 1 250 737 | 3/1989 | Canada . |
| 1 271 115 | 7/1990 | Canada . |
| 2 024 027 | 8/1990 | Canada . |

(List continued on next page.)

OTHER PUBLICATIONS

Robert M. Hunter, Jerry E. Stephens "System for In Situ Rehabilitation of Pipelines", National Sciences Foundation, Jul. 1990.

ASTM C 581-87 entitled "Standard Practice for Determining Chemical Resistance of Thermosetting Resins Used in Glass-Fiber-Reinforced Structures Intended for Liquid Service", An American National Standard, Feb. 27, 1987.

"Replace Old Pipes Without Digging", Insituform of North America, Inc. brochure, 1985.

"The Competitive Alternative", Inliner U.S.A. brochure, before Feb. 21, 1995.

D. Ryhs-Jones, "Inflatable Terylene Reinforced Resin Pipe Linings", First International Conference on the Internal and External Protection of Pipes, Sep. 9, 1975.

World Wide Patents Computer Search, Jan. 16, 1996.

"Product Evaluation Fold and Formed Technology AM-Liner, Ex-Method Nupipe U-Liner", American Consulting Engineers, Inc., Oct. 17, 1995.

*Primary Examiner*—Dennis L. Taylor
*Attorney, Agent, or Firm*—Tobor & Goldstein, L.L.P.

[57] ABSTRACT

A method of lining a pipe conduit to provide superior corrosion resistance. A flexible lining hose, having a resin absorbent layer which has been introduced with a volume of high strength resin, is first positioned inside of the conduit. The lining hose is then expanded into contact with the inner diameter of the conduit by inverting a calibration hose. The calibration hose has an impermeable membrane and a layer of resin absorbent material that has been introduced with a volume of corrosion resistant resin. The calibration hose is inverted by use of fluid pressure inside the lining hose, the fluid pressure being exerted against the impermeable membrane of the calibration hose. The resin layers are then cured by the application of a heated fluid until the lining hose and the calibration hose form a unitary rigid self supporting liner.

21 Claims, 3 Drawing Sheets

U.S. PATENT DOCUMENTS

| | | |
|---|---|---|
| 1,226,023 | 5/1917 | Smith . |
| 1,320,413 | 11/1919 | Reznicek . |
| 1,736,293 | 11/1929 | Van Denburg . |
| 2,090,851 | 8/1937 | Perkins . |
| 2,178,554 | 11/1939 | Bowie . |
| 2,195,222 | 3/1940 | Neumair . |
| 2,198,821 | 4/1940 | Jessup . |
| 2,285,370 | 6/1942 | Staelin . |
| 2,312,993 | 3/1943 | Stephens . |
| 2,326,827 | 8/1943 | Bynum . |
| 2,327,023 | 8/1943 | Danner . |
| 2,345,766 | 4/1944 | Miller . |
| 2,352,768 | 7/1944 | Brend . |
| 2,354,399 | 7/1944 | Noble . |
| 2,575,353 | 11/1951 | MacEvoy . |
| 2,595,408 | 5/1952 | Quest . |
| 2,622,327 | 12/1952 | Halonen . |
| 2,632,205 | 3/1953 | Harris . |
| 2,697,585 | 12/1954 | Chaney et al. . |
| 2,770,950 | 11/1956 | Collins . |
| 2,794,758 | 6/1957 | Harper et al. . |
| 2,910,042 | 10/1959 | Gallmeyer et al. . |
| 2,987,768 | 6/1961 | Given . |
| 3,028,284 | 4/1962 | Reeves . |
| 3,037,228 | 6/1962 | Cummings . |
| 3,061,496 | 10/1962 | Meyer . |
| 3,080,269 | 3/1963 | Pollock et al. . |
| 3,122,786 | 3/1964 | Huisman . |
| 3,132,062 | 5/1964 | Lang et al. . |
| 3,175,392 | 3/1965 | Tharalson et al. . |
| 3,179,551 | 4/1965 | Dudas . |
| 3,333,311 | 8/1967 | Matheny et al. . |
| 3,340,115 | 9/1967 | Rubenstein . |
| 3,376,180 | 4/1968 | Larson et al. . |
| 3,376,181 | 4/1968 | Larson et al. . |
| 3,511,734 | 5/1970 | Darrow . |
| 3,560,295 | 2/1971 | Kimbrell et al. . |
| 3,583,169 | 6/1971 | Morgan . |
| 3,603,096 | 9/1971 | Wells . |
| 3,666,586 | 5/1972 | Lacey . |
| 3,720,557 | 3/1973 | Longoni et al. . |
| 3,753,766 | 8/1973 | Brown et al. . |
| 3,834,421 | 9/1974 | Daley . |
| 3,895,604 | 7/1975 | Ryan . |
| 3,927,464 | 12/1975 | Wallsten . |
| 3,940,942 | 3/1976 | Gower . |
| 3,996,967 | 12/1976 | Takada . |
| 4,009,063 | 2/1977 | Wood .......................... 405/150.1 X |
| 4,064,211 | 12/1977 | Wood . |
| 4,127,430 | 11/1978 | Davis . |
| 4,135,958 | 1/1979 | Wood . |
| 4,182,262 | 1/1980 | Everson et al. . |
| 4,197,908 | 4/1980 | Davis et al. . |
| 4,207,130 | 6/1980 | Barber . |
| 4,233,101 | 11/1980 | Scragg et al. . |
| 4,247,345 | 1/1981 | Kadija et al. . |
| 4,308,824 | 1/1982 | Muta et al. . |
| 4,327,132 | 4/1982 | Shinno . |
| 4,329,937 | 5/1982 | Holland . |
| 4,350,548 | 9/1982 | Zenbayashi et al. ............ 405/150.1 X |
| 4,361,451 | 11/1982 | Renaud ................................. 156/294 |
| 4,366,012 | 12/1982 | Wood . |
| 4,371,569 | 2/1983 | Muta et al. . |
| 4,373,554 | 2/1983 | Cook . |
| 4,385,885 | 5/1983 | Wood . |
| 4,386,628 | 6/1983 | Stanley . |
| 4,390,574 | 6/1983 | Wood . |
| 4,401,696 | 8/1983 | Wood . |
| 4,419,163 | 12/1983 | Yamamoto et al. . |
| 4,434,115 | 2/1984 | Chick . |
| 4,439,469 | 3/1984 | Wood . |
| 4,442,891 | 4/1984 | Wood . |
| 4,443,498 | 4/1984 | Shinno . |
| 4,446,181 | 5/1984 | Wood . |
| 4,456,401 | 6/1984 | Williams .............................. 405/150.1 |
| 4,478,661 | 10/1984 | Lewis . |
| 4,484,602 | 11/1984 | Guthrie . |
| 4,492,095 | 1/1985 | Brister . |
| 4,496,499 | 1/1985 | Brittain et al. . |
| 4,505,613 | 3/1985 | Koga . |
| 4,508,582 | 4/1985 | Fink . |
| 4,529,008 | 7/1985 | Appleton . |
| 4,548,783 | 10/1985 | Dalke et al. . |
| 4,568,581 | 2/1986 | Peoples, Jr. . |
| 4,577,388 | 3/1986 | Wood . |
| 4,581,085 | 4/1986 | Wood . |
| 4,581,247 | 4/1986 | Wood . |
| 4,585,033 | 4/1986 | Westman . |
| 4,593,721 | 6/1986 | Klenk et al. . |
| 4,600,615 | 7/1986 | Hyodo et al. . |
| 4,602,974 | 7/1986 | Wood et al. . |
| 4,604,152 | 8/1986 | Liulkko . |
| 4,622,196 | 11/1986 | Wood . |
| 4,625,766 | 12/1986 | Dohlen et al. . |
| 4,626,133 | 12/1986 | Waring . |
| 4,630,676 | 12/1986 | Long, Jr. . |
| 4,637,588 | 1/1987 | Wilhelm et al. . |
| 4,637,754 | 1/1987 | Wood . |
| 4,640,313 | 2/1987 | Stanley . |
| 4,649,004 | 3/1987 | Nohara et al. . |
| 4,655,638 | 4/1987 | Waring . |
| 4,668,125 | 5/1987 | Long, Jr. . |
| 4,672,832 | 6/1987 | Merker . |
| 4,677,472 | 6/1987 | Wood . |
| 4,680,066 | 7/1987 | Wood . |
| 4,681,783 | 7/1987 | Hyodo et al. . |
| 4,684,419 | 8/1987 | Agosta . |
| 4,684,556 | 8/1987 | Otsuga et al. . |
| 4,685,983 | 8/1987 | Long, Jr. . |
| 4,701,988 | 10/1987 | Wood . |
| 4,710,337 | 12/1987 | Nordström . |
| 4,714,095 | 12/1987 | Muller et al. ....................... 405/154 X |
| 4,723,579 | 2/1988 | Hyodo et al. . |
| 4,733,699 | 3/1988 | Hata . |
| 4,738,565 | 4/1988 | Streatfield et al. . |
| 4,752,431 | 6/1988 | Knowles . |
| 4,752,511 | 6/1988 | Driver . |
| 4,754,781 | 7/1988 | Jan de Putter . |
| 4,758,454 | 7/1988 | Wood . |
| 4,759,656 | 7/1988 | Wilson . |
| 4,770,562 | 9/1988 | Muller et al. ........................... 405/154 |
| 4,773,450 | 9/1988 | Stanley . |
| 4,776,370 | 10/1988 | Long, Jr. . |
| 4,777,984 | 10/1988 | Storah . |
| 4,778,553 | 10/1988 | Wood . |
| 4,786,345 | 11/1988 | Wood . |
| 4,790,975 | 12/1988 | Järvenkylä et al. . |
| 4,808,098 | 2/1989 | Chan et al. . |
| 4,810,453 | 3/1989 | Clarke et al . . |
| 4,819,721 | 4/1989 | Long, Jr. . |
| 4,836,715 | 6/1989 | Wood . |
| 4,867,921 | 9/1989 | Steketee, Jr. . |
| 4,871,413 | 10/1989 | Hyodo et al. . |
| 4,877,665 | 10/1989 | Higuchi et al. . |
| 4,883,557 | 11/1989 | Morinaga et al. . |
| 4,897,135 | 1/1990 | Aylor, Jr. et al. . |
| 4,901,424 | 2/1990 | Menendez . |
| 4,907,624 | 3/1990 | Jonasson . |
| 4,925,381 | 5/1990 | Aoki et al. . |
| 4,933,134 | 6/1990 | Järvenkylä et al. . |
| 4,950,356 | 8/1990 | Grace . |
| 4,950,446 | 8/1990 | Kinumoto et al. . |

| | | |
|---|---|---|
| 4,956,038 | 9/1990 | Morinaga et al. . |
| 4,959,110 | 9/1990 | Russell . |
| 4,972,880 | 11/1990 | Strand . |
| 4,976,290 | 12/1990 | Gelin et al. . |
| 4,980,116 | 12/1990 | Driver . |
| 4,985,196 | 1/1991 | LeDoux et al. . |
| 4,986,951 | 1/1991 | Ledoux et al. . |
| 4,991,006 | 2/1991 | Wood . |
| 4,995,761 | 2/1991 | Barton . |
| 5,018,545 | 5/1991 | Wells . |
| 5,019,417 | 5/1991 | Northcutt . |
| 5,027,895 | 7/1991 | Barton . |
| 5,029,615 | 7/1991 | Müller et al. . |
| 5,030,493 | 7/1991 | Rich . |
| 5,044,405 | 9/1991 | Driver et al. . |
| 5,044,824 | 9/1991 | Long, Jr. et al. . |
| 5,049,003 | 9/1991 | Barton . |
| 5,068,940 | 12/1991 | Sheppard et al. . |
| 5,077,107 | 12/1991 | Kaneda et al. . |
| 5,099,911 | 3/1992 | Vowles . |
| 5,104,595 | 4/1992 | Hunter . |
| 5,106,440 | 4/1992 | Tangeman . |
| 5,108,533 | 4/1992 | Long, Jr. et al. . |
| 5,122,193 | 6/1992 | Derlein . |
| 5,150,989 | 9/1992 | Long, Jr. et al. . |
| 5,154,936 | 10/1992 | Driver et al. . |
| 5,163,481 | 11/1992 | Catallo . |
| 5,172,730 | 12/1992 | Driver . |
| 5,186,215 | 2/1993 | Gilleland . |
| 5,205,886 | 4/1993 | White ................................ 156/294 X |
| 5,213,727 | 5/1993 | Gargiulo . |
| 5,225,121 | 7/1993 | Yokoshima . |
| 5,230,842 | 7/1993 | Munde . |
| 5,241,993 | 9/1993 | Stephens . |
| 5,246,641 | 9/1993 | Perkins et al. . |
| 5,265,648 | 11/1993 | Lyon . |
| 5,265,671 | 11/1993 | Vowles . |
| 5,265,981 | 11/1993 | McNeil . |
| 5,271,433 | 12/1993 | Schwert et al. . |
| 5,280,811 | 1/1994 | Catallo et al. . |
| 5,286,144 | 2/1994 | Griner . |
| 5,307,608 | 5/1994 | Muir et al. . |
| 5,309,947 | 5/1994 | Hinger . |
| 5,322,653 | 6/1994 | Müller . |
| 5,329,063 | 7/1994 | Endoh . |
| 5,340,524 | 8/1994 | McMillan et al. . |
| 5,374,174 | 12/1994 | Long, Jr. . |
| 5,397,513 | 3/1995 | Steketee, Jr. . |
| 5,409,561 | 4/1995 | Wood . |

FOREIGN PATENT DOCUMENTS

| | | |
|---|---|---|
| 0 155 406 | 9/1985 | European Pat. Off. . |
| 0 256 140 | 2/1987 | European Pat. Off. . |
| 0 275 060 | 7/1988 | European Pat. Off. . |
| 0 275 924 | 7/1988 | European Pat. Off. . |
| 0 168 053 | 8/1989 | European Pat. Off. . |
| 0 391 270 | 10/1990 | European Pat. Off. . |
| 1150981 | 5/1956 | France . |
| 2 579 294 | 9/1986 | France . |
| 99 643 | 9/1972 | Germany . |
| 28 10 991 A1 | 9/1978 | Germany . |
| 36 14963 C2 | 10/1987 | Germany . |
| 36 27 556 A1 | 2/1988 | Germany . |
| 39 10 607 A1 | 4/1990 | Germany . |
| 39 31 775 A1 | 4/1991 | Germany . |
| 40 31 741 A1 | 6/1991 | Germany . |
| 58-208014 | 12/1983 | Japan . |
| 63-5921 | 1/1988 | Japan . |
| 29831 | 6/1919 | Norway . |
| 635096 | 4/1950 | United Kingdom . |
| 989870 | 4/1965 | United Kingdom . |
| 1039836 | 8/1966 | United Kingdom . |
| 1 449 455 | 12/1972 | United Kingdom . |
| 1 340 068 | 12/1973 | United Kingdom . |
| 1 357 355 | 6/1974 | United Kingdom . |
| 1 423 819 | 2/1976 | United Kingdom . |
| 2 133 497 | 7/1984 | United Kingdom . |
| 2 218 773 | 11/1989 | United Kingdom . |
| WO83/03131 | 9/1983 | WIPO . |

MULTIPLE RESIN SYSTEM FOR REHABILITATING PIPE

BACKGROUND OF THE INVENTION

1. Field Of The Invention

The present invention relates generally to a method of rehabilitating a pipe conduit which is in a damaged or deteriorated state, and more particularly to a method of lining a deteriorated conduit with a high strength corrosion resistant liner.

2. Description Of The Related Art

Various methods of rehabilitating a pipe conduit, which is buried underground, are known in the art. Generally speaking, such methods include the use of a liner having a diameter which is substantially the same as the inner diameter of the pipe conduit to be rehabilitated. The liner frequently includes an impermeable layer and an adjacent resin absorbing layer. This resin-absorbing layer impregnated with a liquid resin prior to the introduction into the pipe conduit. After being properly positioned in the pipe conduit, the liner is expanded and pressed against the inner surface of the pipe conduit by fluid pressure. While the liner is pressed against the inner surface of the pipe conduit, the resin is cured to form a rigid cured-in-place liner.

One known method of lining a pipe, disclosed in U.S. Pat. No. 4,770,562, uses a lining hose having an outer impermeable layer surrounding and adjacent to an inner resin-absorbent layer. The resin-absorbent layer is saturated with an excess volume of resin. The outer impermeable layer is then perforated to form a plurality of flow-through openings for the resin. The lining hose is subsequently introduced into the pipe conduit in a collapsed state, and the lining hose is shaped to conformingly line the pipe conduit. The shaping of the lining hose is accomplished by inverting an auxiliary hose, also known as a calibration hose, inside the lining hose. The inversion of the calibration hose inside the lining hose will force the excess amount of resin through the flow-through openings and into contact with the inner surface of the pipe conduit. The excess resin will also fill existing cracks and fissures in the conduit. A variation of the liner includes a thin layer of resin-absorbent material outwardly adjacent to the impermeable surface. This thin layer of resin-absorbent material facilitates the spreading of the excess resin once the impermeable layer has been perforated and the shaping of the lining hose process has begun.

Still another known method of rehabilitating a pipe, disclosed in U.S. Pat. No. 4,714,095, utilizes a lining hose having an impermeable outer layer surrounding a resin-absorbent inner layer, which is placed into a pipe conduit. The resin-absorbent layer of the lining hose is permeated with a resin. The lining hose is shaped to conformingly line the pipe conduit by inverting a calibrating hose into the lining hose and pressing the calibrating hose against the lining hose until the lining hose expanded against the pipe conduit. A surface region of a calibrating hose which is to contact the inner layer of the lining hose is provided with a layer containing a second resin. Inherent in the shaping is the purported mixture and/or reaction between the first and second resins along their adjoining surface. This mixture and/or reaction is said to initiate curing and cause at least one of the resins to commence hardening. A shortcoming of that method is that the reaction and/or mixture of the resins occurs only along the area of contact between the inner surface of the lining hose and the outer surface of the calibration hose. As a result, only the resin along the area of contract cures, leaving an inferior liner in place.

A discussed below, the present invention provides an inexpensive, easy to use method of providing corrosion protection, while at the same time providing the strength characteristics necessary for pipe rehabilitation.

SUMMARY OF THE INVENTION

In one aspect, the present invention is directed to a method of rehabilitating an underground conduit such as a sewer or water pipe. In another aspect, the invention is directed to a novel lining structure for an underground conduit.

A preferred method of this invention includes the steps of contacting at least two adjacent resin impregnated absorbent layers of annularly disposed hoses, for example, a calibration hose inside a lining hose, and applying heat to both layers in an amount sufficient to initiate curing of the resins and provide hardening of the absorbent layers. Preferably, each resin is a highly viscous liquid resin that saturates the respective absorbent layer and begins to substantially cure upon application of an effective amount of heat. The heat may be provided by passing heated water through the inside of the inner hose, which may have an outer resin impregnated absorbent layer that is in contact with an inner resin impregnated layer of a lining hose.

In a specific embodiment, two different resins are provided, the first being a structural resin, which upon curing provides mechanical support and strength, the second being a corrosion resistant resin. The structural resin may be a high strength resin, such as but not limited to polyester resin. That resin's ability to resist corrosion is not critical. On the other hand, it is important for the corrosion resistant resin to be capable of resisting corrosion. For example, the second resin should be capable of retaining substantial impermeability to liquid in spite of repeated contact with corrosive materials such as acids and other corrosive chemicals that could cause damage and deterioration to the first resin. At a minimum, the second resin should have a greater resistance to chemicals than the first resin. Preferably, the second resin meets or exceeds industry standards for corrosion resistance.

BRIEF DESCRIPTION OF THE DRAWINGS

The foregoing and other advantages of the invention will become apparent upon reading the following detailed description and upon reference to the drawings in which.

Figure 1:
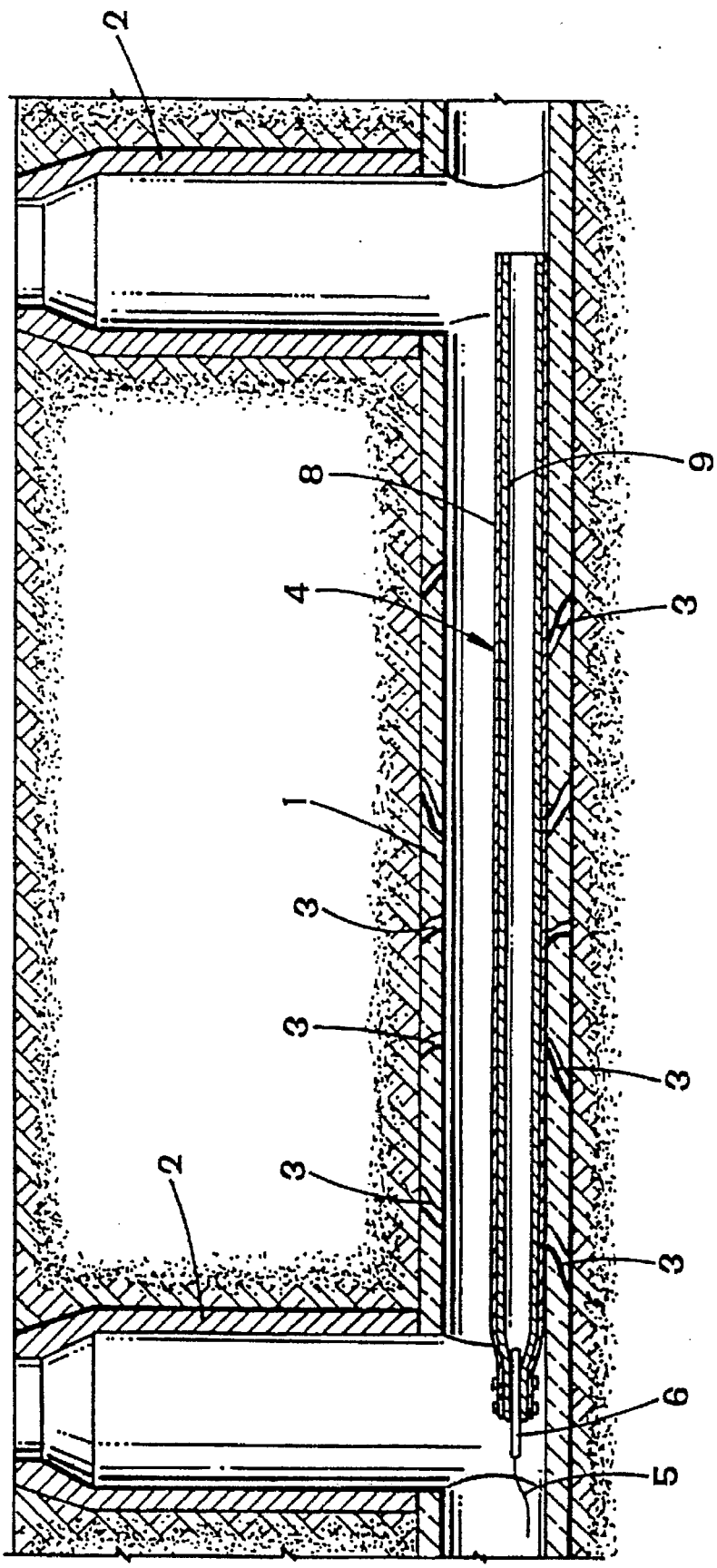
FIG. 1 is a longitudinal-section view of a pipe conduit section between two control shafts with a lining hose received therein in its collapsed state.

While a person skilled in the art will recognize various modifications and alternative forms of the invention, specific embodiments have been shown by way of example in the drawings and will be described in detail herein. However, it should be understood that the invention is not intended to be limited to the particular forms disclosed. Rather, the invention covers all modifications, equivalents and alternatives falling within the spirit and scope of the invention as defined by the appended claims.

DETAILED DESCRIPTION OF EMBODIMENTS OF INVENTION

In one aspect, the invention is directed to a method of rehabilitating an underground conduit. The method preferably includes the steps of contacting adjacent resin impregnated absorbent layers of annularly disposed hoses, such as a calibration hose placed within a lining hose, and applying heat to both layers in an amount sufficient to initiate curing of the resins and provide hardening of the absorbent layers. The heat may be provided by passing heated water through the inside of a calibration hose, which may have an outer resin impregnated absorbent layer that lies in adjacent contact with an inner resin impregnated absorbent layer of a lining hose. Prior to the application of effective heat the lining structure the liner is soft and the resin is in an uncured state. After an effective amount of heat is applied substantial curing is initiated. As heat continues to be applied, the liner gradually becomes hardened resulting in a cured-in-place pipe having two adjacent layers containing cured resin, the outer layer providing structural support and mechanical strength, the inner layer providing corrosion resistance. Preferably, in both the method and lining structure aspects of the invention, prior to curing each resin is a highly viscous liquid resin that cures upon application of heat and, more preferably, includes a heat initiated eating agent.

Figure 4:
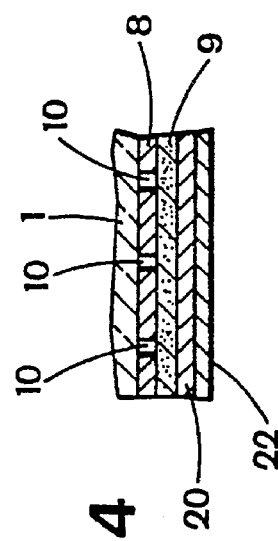
FIG. 4 is a partial section view at enlarged scale taken along the line A—A of FIG. 3.

In a specific embodiment of the invention, a calibration hose is provided which has a resin absorbent layer on its inside surface initially. After inversion, the resin absorbent layer forms the outside surface of the calibration hose which may then contact the inner resin absorbent layer of the lining hose. Referring to FIG. 4, in the lining structure of the invention, the inside layer 9 of the lining hose may be considered an "outer resin absorbent layer" relative to the other resin absorbent layer 20, which although forming the outside layer of the calibration hose after inversion, may be considered an "inner resin absorbent layer" relative to layer 9. Preferably, the outer resin absorbent layer, impregnated with the first resin, is thicker than the inner resin absorbent layer. For example, the outer layer should have a thickness ranging from about 3 to 40 mm, while the inner layer should have a thickness ranging from about 1 to 3 mm.

The outer resin absorbent layer contains a first resin and the inner resin absorbent layer contains a second resin. Preferably, the layers are adjacent to one another, and each layer preferably contains a resin that includes an effective amount of a heat initiated curing agent. By "effective amount" it is meant that the curing agent should be present in an amount sufficient to respond to effective heat being applied by, for example, heated water flowing through the calibration hose. The term "effective heat" as used herein means heat applied externally in an amount and for a time sufficient to initiate substantial curing of the resin. While even without the application of heat it is contemplated that a resin may eventually cure to some degree, the term "substantial curing" refers to a sudden increase in crosslinking at a molecular level in the resin. The resins become hardened after curing is completed.

In a specific embodiment, the first resin is a structural resin that primarily provides mechanical support and strength to the cured structure. Such mechanical support may be enhanced where a relatively thick resin absorbent layer is used. The second resin should be a corrosion resistant resin or, more preferably, a substantially corrosion resistant resin. It is critical that the corrosion resistant resin be capable of effectively resisting corrosion. For example, the second resin should be capable of retaining substantial impermeability to liquid in spite of potential contact with corrosive chemicals that could cause damage and deterioration to the first resin, such as acids and other corrosive chemicals that exist in underground sewer pipes. At a minimum, the second resin should have a greater resistance to chemicals than the first resin.

Preferably, both resins contain an effective amount of a heat initiated curing agent, which causes substantial curing of the resins in response to application of effective heat. Advantageously, hardening of the lining structure inside the conduit to be rehabilitated may be initiated primarily by heating rather than mixing or contact between the resins. It has been discovered that the initiation of curing by mixing or contact has certain shortcomings. For example, due to their high viscosity, the resins may not transfer easily between the adjacent absorbent layers, so that mixing is incomplete. Thus, crosslinking at the molecular level may tend to be restricted to the interface between the two resin absorbent layers, which may result in incomplete or irregular curing. In contrast, in a specific embodiment of the present invention, both resins contain heat initiated curing agents, such as certain organic peroxides, which respond to application of heat. Consequently, it is contemplated that crosslinking in both resins may be more uniform, being initiated throughout the resin absorbent layers rather than merely at the interface between the layers. Examples of heat initiated organic peroxide curing agents which are available commercially include Perkadox 16 and Trigonox 42S, both available from Akzo Chemicals, Inc.

In accordance with a specific embodiment of the invention, the method includes the steps of saturating a resin-absorbing inner layer of a lining hose with a resin that provides structural support and mechanical strength to the cured-in-place pipe formed inside the conduit to be rehabilitated. The lining hose, which includes an impermeable layer that outwardly adjoins and surrounds the inner layer, has an outer diameter that may be substantially the same as the inner diameter of the pipe conduit to be rehabilitated. The lining hose may then be introduced in a collapsed state into the pipe conduit.

After positioning the lining hose inside the pipe conduit, the lining hose may then be expanded and shaped to conformingly line the conduit. Such expansion may be accomplished by introducing a calibration hose into the lining hose, preferably by inverting the calibration hose under fluid pressure inside the lining hose. The resin-absorbent layer of the calibration hose is preferably saturated with a corrosion resistant resin, such as but not limited to, epoxy vinyl ester. Prior to inversion, the calibration hose may have a resin-absorbent inner layer adjacent an impermeable outer layer. After inversion, the resin-absorbent layer forms the outer surface of the calibration hose and is adjacent to the resin-absorbent inner layer of the lining hose. After inversion, the temperature of the fluid may be increased, for example, by heating water flowing through the calibration hose, to accelerate curing and solidification of the resins. Upon curing the calibration hose becomes an integral part of the liner, thereby providing enhanced corrosion resistance to the finished liner.

Figure 2:
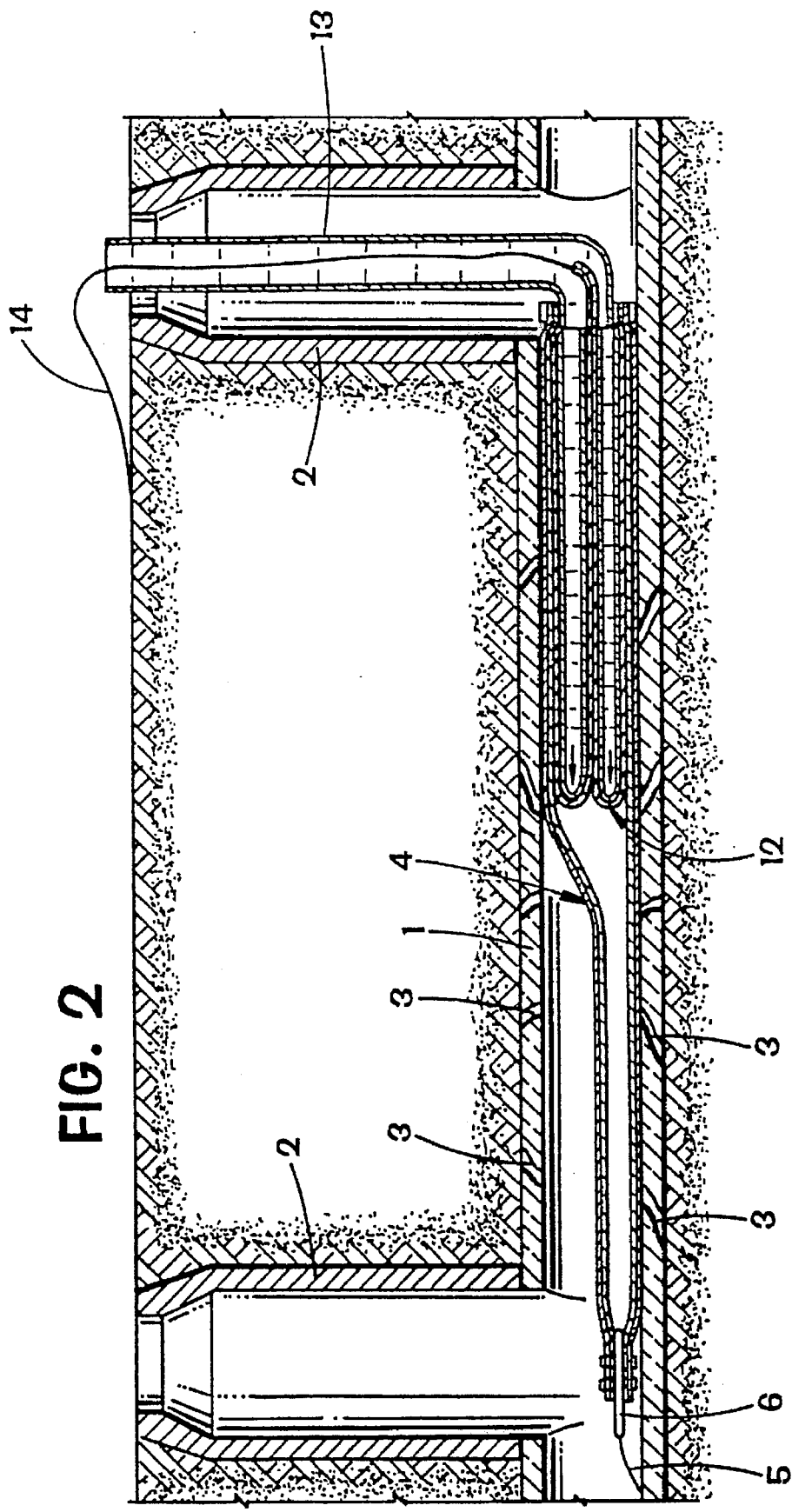
FIG. 2 is a view similar to FIG. 1 but illustrating the inversion of the calibration hose into the lining hose.
Figure 3:
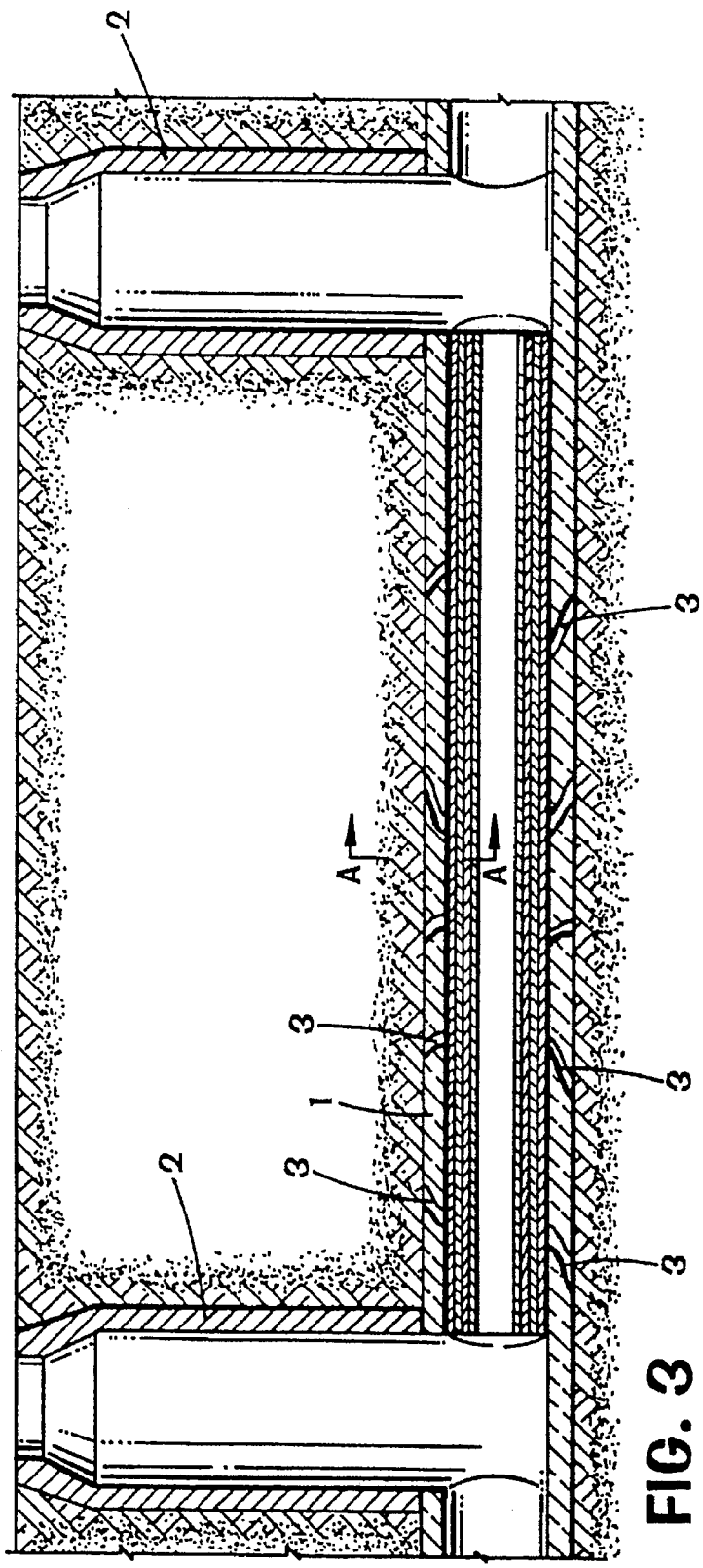
FIG. 3 is a view similar to FIG. 1 illustrating the liner in place after installation of the calibration hose.

Turning now to the drawings and referring initially to FIGS. 1–3, there is illustrated a section of the pipe conduit 1 which is buried underground and situated between two control shafts or manholes 2 that lead to the surface. The pipe conduit 1 generally is in a deteriorated shape and may include a plurality of cracks or fissures 3.

Referring to FIG. 1, a lining hose 4 is shown in the interior of the section of the pipe conduit 1 between the two control shafts 2 having been pulled into the illustrated position in its flattened or collapsed state by means of a rope or cable 5 and a non-illustrated winch. The rope or cable 5 is secured to one end of the lining hose 4 by pulling member 6 as illustrated in FIG. 1. The pulling of the lining hose 4 into the pipe section is generally known in the art.

The lining hose 4 consists of an outer covering layer or film 8 and of an inner layer 9 which is constructed of a resin absorbing material. The inner layer 9 of the lining hose 4 can be made, for example, of non-woven fibrous material such as polyester needled felt. In a preferred embodiment, the inner layer 9 utilizes a non-woven felt of pentalobal fibers which are needled to orient the fibers in such a way as to increase the circumferential stretch of the felt while minimizing the longitudinal stretch of the felt material. The outer covering layer 8 is impermeable to fluids and is preferably made of synthetic plastic material, such as polyurethane, polyvinyl chloride, polyethylene or other like material. The outer covering layer 8 may be attached to the resin-absorbent layer 9 by adhesion, extrusion or other appropriate methods known in the industry.

Prior to inserting the lining hose 4 in the pipe conduit 1 to be lined, the resin-absorbing material of the lining hose 4 is soaked with a volume of structural resin, preferably a high strength resin. High strength resins suitable for rehabilitating a pipe conduit using a cured-in-place liner are resins having a flexural modulus of at least 250,000 p.s.i., a flex strength of at least 4,500 p.s.i., a tensile modulus of at least 250,000 p.s.i., and a tensile strength of at least 3,500 p.s.i., after curing. These strength characteristics are determined according to the industry standard testing method defined in ASTM D790 (August 1992) and entitled "Standard Test Methods for Flexural Properties of Unreinforced and Reinforced Plastics and Electrical Insulating Materials," which is recognized by persons skilled in the art. In a preferred embodiment, polyester, urethane, acrylate, bisphenal A fumarate polyester, or isothpholic glycol polyester resins will provide the necessary high strength and are optimal resins for impregnating the resin-absorbing material of the lining hose 4. The resin-absorbent layer 9 may be saturated with resin using vacuum impregnation or injection methods which are known in the art.

In a further embodiment, solid filler materials such as mineral fillers, silica, and liquid fillers such as styrene, divinyl benzene, diallyl phthalate, vinyl tolene or any other vinyl substituted organic or organometallic module that will cure as part of the resinous network are incorporated in one or both of the resins to provide the desired strength at a reduced cost. Examples of mineral fillers include calcium carbonate, aluminum trihydrite, calcium sulfate and clays such as bentonite. Fillers tend to be less expensive than the high strength resin and may be mixed with the resin to decrease the volume of resin, and hence the cost of the resin, needed to saturate the resin absorbent layer of the lining hose.

The resin soaked lining hose 4 is flexible enough to be pulled into the pipe conduit 1 in a collapsed position. The lining hose 4 will later be expanded to substantially the inner diameter of the pipe conduit 1 to be lined. Accordingly, the lining hose 4 should be constructed to have substantially the same diameter as the inner diameter of the pipe conduit 1 to be lined. Due to its flexible nature, the lining hose 4 may be installed through the existing control shaft 2 with little or no excavation work.

The impregnation of resin may be performed directly at the installation site or it may be accomplished off-site at a warehouse location or other appropriate location. After the volume of resin has been introduced into the lining hose 4, the outer covering layer 8 of a preferred embodiment may be perforated so as to provided the outer covering layer 8 with flow-through openings 10 as illustrated in FIG. 4. The perforating of the lining hose 4 may be performed at the installation site or it may be performed off-site, for example, where the resin impregnation takes place. Methods of perforating the lining hose 4 are known in the art.

One method of introducing the calibration hose 12 into the lining hose 4 situated in the pipe conduit 1 is illustrated in FIG. 2. An inversion pipe 13, which has the configuration of a tubular elbow, is inserted into the proximal control shaft 2 as shown in FIG. 2. The length of the inversion pipe 13 will vary in order to accommodate the height or depth of the control shaft 2. The forward-most free end of the calibration hose 12 and the associated end of the lining hose 4 are attached to the horizontally extending portion of inversion pipe 13. Before attaching the calibration hose 12 to the inversion pipe 13, the forward end is turned over outwardly. The turned over portion of the calibration hose 12 and the associated end of the lining hose 4 may be attached to the inversion pipe 13 by use of steel bands or other appropriate means.

Figure 5:
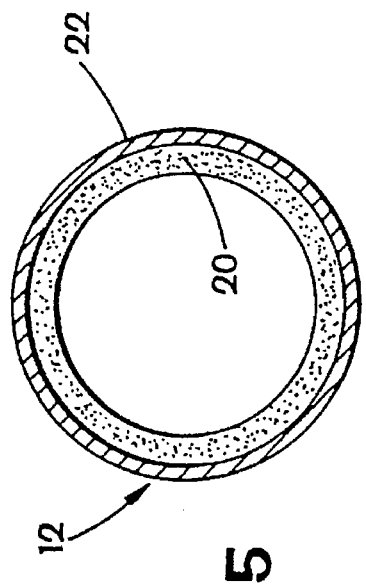
FIG. 5 is a cross-sectional view illustrating the calibration hose before the hose is inverted, with the resin-absorbent layer on the inside of the hose.

As illustrated in FIG. 5, the calibration hose 12 may have a resin-absorbent layer 20 and an impermeable layer or membrane 22 that outwardly adjoins and surrounds the resin-absorbent layer 20. The resin-absorbent layer 20 may be a non-woven fibrous material such as polyester needled felt. A preferred embodiment of the calibration hose 12 of this invention utilizes a non-woven felt of pentalobal fibers which are needled to orient the fibers in such a way to increase the circumferential stretch of the felt while minimizing the longitudinal stretch of the felt material.

The impermeable layer or membrane 22 of the calibration hose preferably is a synthetic plastic material, such as polyurethane, polyvinyl chloride, polyethylene, or other like material. The outer layer 22 should be impermeable to the fluid used to invert the calibration hose 4. Water is generally used as the inverting fluid. However, air or other gaseous mediums may be used to invert the calibration hose so long as layer 22 is impermeable to the inverting medium.

The impermeable outer layer 22 may be attached to the resin-absorbent layer 20 by adhesion, extrusion or other appropriate methods known in the art. A preferred embodiment of the calibration hose 12 has a relatively thin layer of resin-absorbent material 20 attached to a film of synthetic material such as polyurethane. By way of example, the above mentioned embodiment utilizes a 10–16 mils thick film of polyurethane for the outer impermeable layer 22 and a 1.5–2.0 mm thick layer of polyester needled felt for layer 20.

Prior to attaching the calibration hose 12 to the inversion pipe 13, the resin absorbent layer 20 of the calibration hose 12 is saturated with a corrosion resistant resin. Corrosion resistant resins are resins which after curing have a corrosion resistance that meets or exceeds the chemical resistance and physical property requirements set forth in the industry standards of either ASTM F1216 (Jul. 15, 1991 edition) entitled "Standard Practice for Rehabilitation of Existing Pipelines and Conduits by the Inversion and Curing of a Resin-Impregnated Tube" or the Southern California Green Book for cured-in-place pipe (Standard Specification for Public Work Construction, Section 500-1.4 and 210.2.3, published by BNI Building News, 1991 edition). Such corrosion resistance and physical properties are determined using the industry standard testing guidelines defined by ASTM C581 (April 1987) entitled "Standard Practice for Determining Chemical Resistance of Thermosetting Resins used in Glass-Fiber-Reinforced Structures Intended for liquid Service" and ASTM D543 (April 1987) entitled "Standard Test Method for Resistance of Plastics to Chemical Reagents." In a preferred embodiment, vinyl ester resins including epoxy vinyl ester, urethane based vinyl ester, novolac based vinyl ester and bisphenol A fumarate based vinyl ester resins provide the required corrosion resistance. Chlorendic anhydride and epoxy resins are other examples of corrosion resistant resins. The corrosion resistant resin selected for the calibration hose must be compatible with the high strength resin of the lining hose so that the curing process for either resin is not adversely effected by the other resin.

When the calibration hose 12 is initially attached to the inversion pipe 13, only the connecting end of the calibration hose 12 is turned outwardly. As a result of the introduction of water into the inversion pipe 13, and in dependence on the attendant pressure buildup, the calibration hose 12 is expanded by the water and, at the same time, the region of turning over of the calibration hose 12 becomes gradually and progressively displaced away from the region of attachment of the liner hose 4 and calibration hose 12 to the inversion pipe 13. To maintain a substantially constant fluid pressure, it is desirable to maintain the height of the water column contained in the inversion pipe 13 substantially constant.

As indicated in FIG. 2 by arrows in the already turned over or inverted portion of the calibration hose 12, the pressure exerted by the water present in the calibration hose is directed against the instantaneous leading end of the calibration hose 12 and also perpendicular against the internal surface of the calibration hose 12. As the water pressure inverts the calibration hose 12, much like a sock being turned inside out, the inverted calibration hose pushes radially against the lining hose 4, which is consequently expanded, shaped and pressed against the internal surface of the pipe conduit 1. The impermeable layer 22 of the calibration hose 12 prevents the water from contaminating or washing away the resin contained in the lining hose 4 or the calibration hose 12. A rope or cable 14 may be connected to the trailing end of the calibration hose 12. The rope or cable 14 may be used to control the forward progress of the calibration hose 12 during inversion. A fire hose or there suitable means may also be attached to the rope or cable 14. As the calibration hose 12 inverts, the resin-impregnated layer 20 of the calibration hose 12, which is originally located at the interior of the calibration hose 12, is gradually transferred to the exterior of the calibration hose 12 and is pressed against inner layer 9 of lining hose 4.

In a preferred embodiment, a volume of resin in excess of the volume needed to fully saturated the resin absorbent layer 9 of the lining hose 4 is initially distributed within the lining hose 4. The excess volume of resin is forced through the flow through openings 10 of the lining hose 4 as the calibration hose 12 is inverted through the lining hose 4. The excess resin which passes through the flow-through openings 10 of the outer layer 8 of the lining hose 4 will bond the lining hose 4 to the infernal surface of the pipe conduit 1. Any remaining excess resin will flow into the cracks or fissures 3 of the conduit 1.

After the lining hose 4 has been fully shaped and expanded to the internal diameter of the pipe conduit 1, the resins are cured. Advantageously, because the curing process is not initiated based on the reaction and/or admixture of the two different resins, curing is not limited to the area of contact between the resins. Both resins are cured in their entirety during the curing process.

The curing process may be initiated by heating the water to invert the calibration hose 12. By way of example, hot water may be circulated through the fire hose attached to cable 14 and back through the calibration hose until the resin cure. Upon curing, the lining hose 4 and the calibration hose 12 form a rigid unitary self supporting liner which is physically attached to the original pipe conduit 1. This is illustrated in FIG. 3.

Structurally, the self supporting liner includes an interior surface comprising the impermeable membrane 22 of the former calibration hose 12 outwardly surrounded by a corrosion resistant layer formed by the cured corrosion resistant resin. Outwardly surrounding the corrosion resistance layer will be a relatively thicker layer comprising the cured high strength resin. Over time, the membrane 22 may deteriorate or become worn away. Advantageously, however, the corrosion resistant layer will remain to protect the liner from corrosive materials, thereby extending the useful life of the liner.

What is claimed:

1. A method of lining an underground conduit with a cured-in-place pipe, comprising placing within the conduit a lining hose having a first resin absorbent layer containing a first resin; placing within the lining hose a calibration hose having a second resin absorbent layer containing a second resin; and applying heat to the first and second resins to initiate substantial curing of said resins, said heat being applied for a time sufficient to harden both resin absorbent layers, wherein the first and second resins are in liquid form and remain as liquids upon contact with each other, without substantial curing, until said heat is applied.

2. The method of claim 1, in which said heat is applied by introducing a heated fluid within the calibration hose.

3. The method of claim 1, in which the second resin is a corrosion resistant resin, having a higher chemical resistance than the first resin.

4. The method of claim 1, in which after hardening the cured-in-place pipe is capable of meeting the chemical resistance test set forth in ASTM F-1216 (Jul. 15, 1991 edition).

5. The method of claim 1, in which the second resin comprises epoxy vinyl ester, a urethane based vinyl ester, a bisphenol A fumarate based vinyl ester, chlorendic anhydride, or epoxy.

6. The method of claim 1, in which one or both of the resins includes a heat initiated curing agent.

7. The method of claim 1, in which one or both of the resins includes an organic peroxide curing agent.

8. A method of lining a conduit, comprising the steps of:
    positioning a flexible lining hose inside said conduit, said lining hose having an outer layer and a first resin absorbent layer containing a first liquid resin;
    placing a calibration hose inside the lining hose, said calibration hose having a second resin absorbent layer containing a second liquid resin;
    introducing pressurized fluid into the calibration hose wherein said first resin absorbent layer is disposed in substantial contact with said second resin absorbent layer, such that at least a portion of the first liquid resin mixes with at least a portion of the second liquid resin, said first and second resins remaining liquid upon mixing;
    initiating the curing of the first and second resins by introducing heated pressurized fluid into the calibration hose, wherein the first and second resins remain as liquids upon contact with each other, without substantial curing, until said heated pressurized fluid is introduced; and completing the curing of the first and second resins by continuing to introduce heated pressurized fluid into the calibration hose to provide a hardened unitary lining structure.

9. A method of lining a conduit comprising the steps of:

positioning a flexible lining hose inside said conduit, said lining hose having a first resin absorbent layer which has been introduced with a volume of a high strength resin;

expanding said lining hose to substantially an inner diameter of said conduit by inverting a calibration hose with fluid pressure inside said lining hose, said calibration hose having a second resin absorbent layer adjacent an impermeable membrane, said second resin absorbent layer of said calibration hose being saturated with a corrosion resistant resin, said fluid pressure being exerted directly against said impermeable membrane; and curing said high strength resin of said flexible lining hose and said corrosion resistant resin of said calibration hose until said lining hose and said calibration hose form a rigid liner.

10. The method of claim 1, wherein after curing said resin has a flexural modulus of at least 250,000 p.s.i., a flex strength of at least 4,500 p.s.i., a tensile modulus of at least 250,000 p.s.i., and a tensile strength of at least 3,500 p.s.i.

11. The method of claim 1, wherein said corrosion resistant resin meets or exceeds corrosion and physical property requirements defined by ASTM F1216 and the Southern California Green Book after curing.

12. The method of claim 1, where said step of curing comprises the step of heating said high strength resin and said corrosion resistant resin.

13. The method of claim 12, wherein said step of heating comprises the step of introducing a heated fluid into intimate contact with said impermeable membrane.

14. The method of claim 1, wherein said second resin absorbent material comprises a non-woven felt of pentalobal fibers.

15. The method of claim 1, wherein said high strength resin comprises a filler material.

16. The method of claim 15, wherein said filler material is selected from the group consisting of mineral fillers, silica, and clay.

17. The method of claim 15, wherein said filler material is selected from the group consisting of styrene, divinyl benzene, diallyl phthalate, vinyl tolene, and a vinyl substituted organic or organometallic module that will cure as part of a polymer network.

18. A method of lining a conduit comprising the steps of:

positioning a flexible lining hose inside said conduit, said lining hose having a first resin absorbent layer which has been introduced with a volume of a high strength resin selected from the group consisting of polyester, urethane, bisphenol A fumarate polyester, and isothpholic neopentol glycol;

expanding said lining hose to substantially an inner diameter of said conduit by inverting a calibration hose with fluid pressure inside said lining hose, said calibration hose having a layer of a second resin absorbent material adjacent an impermeable membrane, said second resin absorbent layer of said calibration hose being saturated with a corrosion resistant resin selected from the group consisting of epoxy vinyl ester, urethane based vinyl ester, chlorendic anhydride, and epoxy; said fluid pressure being exerted directly against said impermeable membrane; and curing said high strength resin of said flexible lining hose and said corrosion resistant resin of said calibration hose by introducing a heated fluid into intimate contact with said impermeable membrane until said lining hose and said calibration hose form a rigid liner.

19. A method of lining a conduit comprising the steps of:

positioning a flexible lining hose inside said conduit, said lining hose having a first resin absorbent layer which has been introduced with a volume of a high strength resin selected from the group of: polyester and isothpholic neopentol glycol polyester;

expanding said lining hose to substantially an inner diameter of said conduit by inverting a calibration hose with fluid pressure inside said lining hose, said calibration hose having a layer of a second resin absorbent material adjacent an impermeable membrane, said second resin absorbent material adjacent an impermeable membrane, said resin absorbent layer of said calibration hose being saturated with a corrosion resistant resin selected from the group of: epoxy vinyl ester, urethane based vinyl ester, bisphenol A fumarate based vinyl ester, urethane based vinyl ester, chlorendic anhydride, and epoxy; said fluid pressure being exerted directly against said impermeable membrane; and curing said high strength resin of said flexible lining hose and said corrosion resistant resin of said calibration hose by introducing a heated fluid into intimate contact with said impermeable membrane until said lining hose and said calibration hose form a rigid liner.

20. A method of lining a conduit comprising the steps of:

positioning a flexible lining hose inside said conduit, said lining hose having a first resin absorbent layer which has been introduced with a volume of a high strength resin having a flexural modulus of at least 250,000 p.s.i., a flex strength of at least 4,500 p.s.i., a tensile modulus of at least 250,000 p.s.i., and a tensile strength of at least 3,500 p.s.i. after curing;

expanding said lining hose to substantially an inner diameter of said conduit by inverting a calibration hose with fluid pressure inside said lining hose, said calibration hose having a layer of a second resin absorbent material adjacent an impermeable membrane, said second resin absorbent layer of said calibration hose being saturated with a corrosion resistant resin which meets or exceeds chemical resistance and physical property requirements defined by ASTM F1216 and the Southern California Green Book after curing; said fluid pressure being exerted directly against said impermeable membrane; and curing said high strength resin of said flexible lining hose and said corrosion resistant resin of said calibration hose by introducing a heated fluid into intimate contact with said impermeable membrane until said lining hose and said calibration hose form a rigid liner.

21. A method of lining a conduit comprising the steps of:

positioning a flexible lining hose inside said conduit, said lining hose having a first resin absorbent layer which has been introduced with a volume of a high strength resin including a filler material selected from the group consisting of: mineral fillers, silica, clay, styrene, divinl benzene, diallyl phthalate, vinyl tolene, and a vinyl substituted organic or organometallic module that will cure as part of a polymer network;

expanding said lining hose to substantially an inner diameter of said conduit by inverting a calibration hose with fluid pressure inside said lining hose, said calibration hose having a layer of a second resin absorbent material adjacent an impermeable membrane, said second resin absorbent layer of said calibration hose being saturated with a corrosion resistant resin, said fluid pressure being exerted directly against said impermeable membrane; and curing said high strength resin of said flexible lining hose and said corrosion resistant resin of said calibration hose until said lining hose and said calibration hose form a rigid liner;

wherein said second resin absorbent material comprises a non-woven felt of pentalobal fibers.

* * * * *